Dec. 23, 1969     A. D. BAKER     3,485,470

REAR VIEW MIRRORS FOR ROAD VEHICLES

Filed April 22, 1968     3 Sheets-Sheet 1

INVENTOR
A. D. Baker.
BY
ATTORNEYS

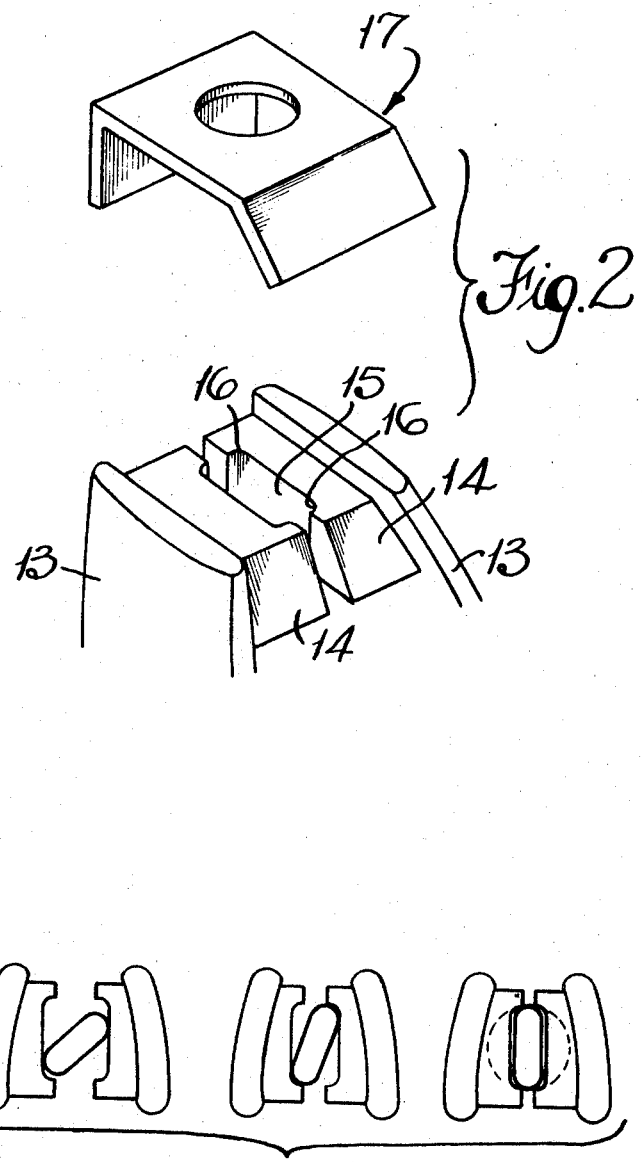

Dec. 23, 1969   A. D. BAKER   3,485,470
REAR VIEW MIRRORS FOR ROAD VEHICLES
Filed April 22, 1968   3 Sheets-Sheet 3
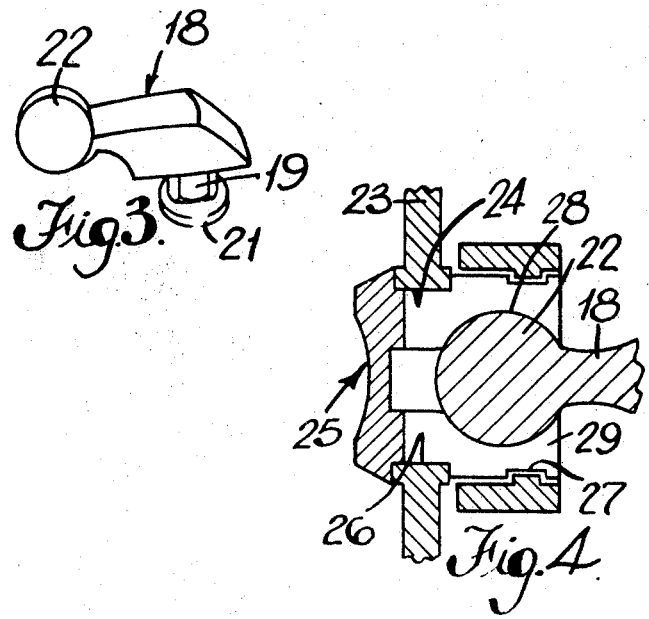
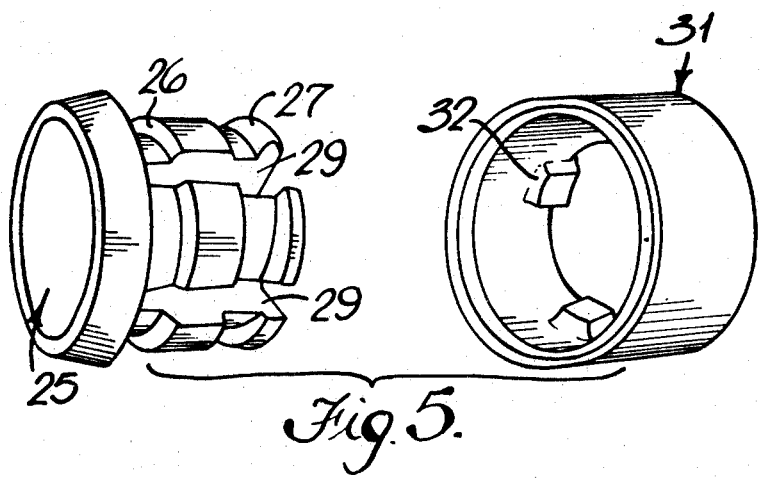
INVENTOR
A. D. Baker

United States Patent Office 3,485,470
Patented Dec. 23, 1969

3,485,470
REAR VIEW MIRRORS FOR ROAD VEHICLES
Alfred Dickens Baker, Solihull, England, assignor to Joseph Lucas (Industries) Limited, Birmingham, England
Filed Apr. 22, 1968, Ser. No. 723,148
Claims priority, application Great Britain, May 26, 1967, 24,610/67
Int. Cl. A47g 1/24
U.S. Cl. 248—484                                    7 Claims

ABSTRACT OF THE DISCLOSURE

A rear view mirror for a road vehicle includes a support member which is adapted to be secured to the body panel of a road vehicle, and which has extending therefrom a pair of resilient, generally parallel arms. The mirror further includes a reflective portion which has associated therewith a non-circular pin. The pin is gripped between the free ends of said arms, and the arrangement is such that when the reflective element is deflected in a manner to rotate the pin the arms are flexed apart, so that when the reflective element is released the resilience of the arms returns the reflective member to its original position.

---

Figure 1:
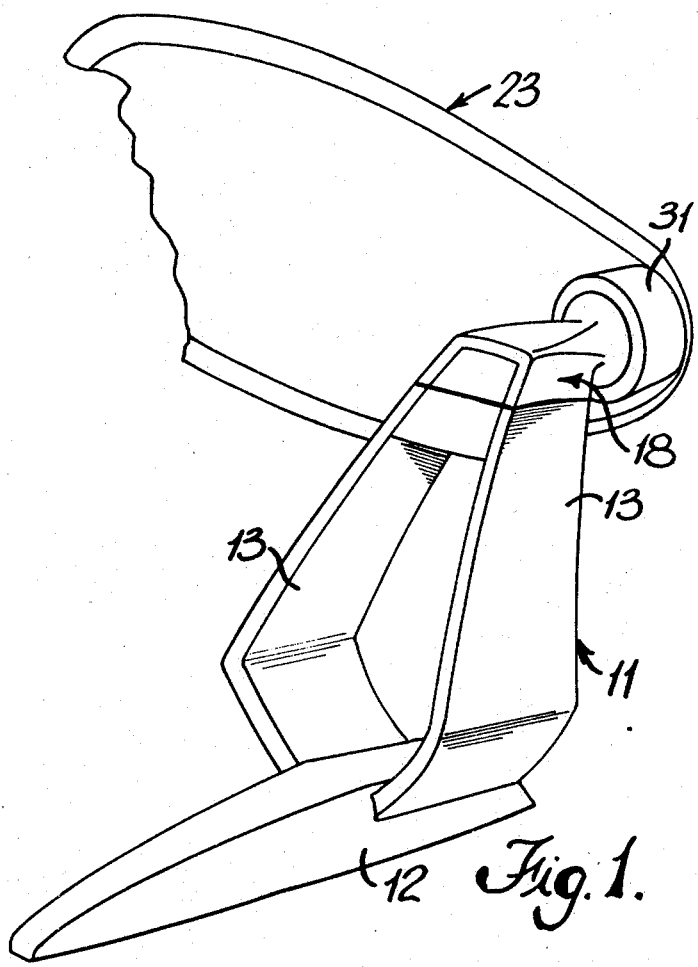

This invention relates to rear view mirrors for road vehicles.

A rear view mirror according to the invention comprises in combination a reflective member, a support member adapted to be secured to a body panel of a road vehicle, a pair of generally parallel resilient arms integral with said support member and extending therefrom said arms being so arranged that their free ends, remote from the support member are urged toward one another by the resilience of the arms, and a non-circular pin associated with said reflective member, said non circular pin having at least one axially extending flat surface and being gripped between said free ends of said arms, with said flat surface engaged with a corresponding surface on one of said free ends and the arrangement being such that when said reflective member is moved relative to said support member in a direction to rotate said pin through a predetermined distance then as said pin is rotated, said arms will be flexed apart and when said reflective member is released said pin will be returned to its original position under the action of said arms.

One example of the invention is shown in the accompanying drawings wherein:

FIGURE 1 is a perspective view of a rear view external mirror for a road vehicle, FIGURE 2 is an exploded perspective view of the upper end of the support member shown in FIGURE 1, FIGURE 3 is a perspective view of the connecting member interconnecting the support member and the reflective member shown in FIGURE 1, FIGURE 4 is a sectional view of the connection between the connecting member and the reflective member, FIGURE 5 is an exploded perspective view of part of FIGURE 4, and FIGURE 6 is a diagrammatic representation of the support member in three angular positions of the reflective member relative to the support member.

Referring to the drawings, the mirror comprises a molded synthetic resin support member 11 having a base 12 adapted to be secured to a body panel of a road vehicle. Extending upwardly from the base and integral therewith are a pair of resilient arms 13 which are provided at their free ends with respective blocks 14 (FIGURE 2). The blocks 14 are urged into engagement with one another by the resilience of the arms 13, and are shaped to define therebetween a channel 15 having rounded ends 16. Engaged with the support member 11 is a generally U-shaped plate 17 the limbs of which engage the ends of the blocks 14 and the base of which engages the upper surface of the blocks 14, the base of the plate 17 having a hole formed therein corresponding with the channel 15. The plate 17 ensures that the blocks 14 can only move directly towards or away from one another and can not slide relative to one another.

Engaged in the channel 15 and gripped by the blocks 14 is a pin 19 integral with a connecting member 18 (FIGURE 3), the pin having a cross section similar to that of the channel 15 and being provided at its lower end with a peripheral outwardly extending flange 21 which engages the lower surfaces of the blocks 14 to prevent the pin 19 being withdrawn upwardly from the channel 15. At its end remote from the pin 19 the member 18 is formed with an integral spherical portion 22.

The mirror further comprises a reflective member 23 in the form of a plate like synthetic molding. The member 23 is so molded that one surface thereof has thereon a specular finish which, when the member 23 is plated with chromium becomes highly reflective and constitutes a mirror. The other surfaces of the member 23 are molded so as to have a broken finish which ensures that the surfaces are decorative rather than reflective after the plating operation. Adjacent one edge thereof the member 23 is formed with a hole 24 which receives a molded synthetic resin cylindrical member 25. The member 25 is formed with a pair of axially spaced circumferential grooves 26, 27 and a part spherical recess 28 (FIGURE 4), the member 25 being formed with four axially extending equiangularly spaced slots 29 which render the wall of the recess 28 resilient.

The member 25 is inserted into the hole 24 in the member 23 and the member 23 snaps into the circumferential groove 26 in the member 25, the portion of the member 25 having the groove 27 and the recess therein projecting from the face of the member 23 remote from the highly reflective face thereof. The portion of the member 25 having the groove 27 and the recess 28 therein is divided into four fingers by the slots 29 and each finger includes a part of the groove 27 in its outer surface. The depth of each portion of the groove 27 increases from a minimum at its one end to a maximum at its other end so that taken as a whole the base of the groove 27 has four similar arcuate ramps formed thereon. Engaged with the member 25 is a molded synthetic resin clamping sleeve 31 the outer surface of which is provided with axial ribs to facilitate manual rotation of the sleeve 31 and the inner surface of which is formed with four circumferentially aligned, radially extending, equiangularly spaced posts 32.

In order to interconnect the support member 11 and the reflective member 23 the spherical portion 22 of the member 18 is snapped into the recess 28 in the member 25 and the member 23 is adjusted to the desired position relative to the support member 11, the relative movement of the member 23 with respect to the member 11 being permitted by the ball and socket joint constituted by the portion 22 and the recess 28. The clamping sleeve 31 is then rotated relative to the member 25 in a direction to cause the posts 32 to ride up the ramps on the base of the groove 27. As the posts 32 ride up the ramps the four fingers of the member 25 are moved radially inward and the wall of the recess 28 is caused to grip the portion 22 to clamp the member 23 relatively to the member 11. Moreover the grooves 26, 27 and the recess 28 are so positioned relative to one another that as the clamping action takes place the parts of the fingers of the member 25 adjacent the groove 26 are caused to flex radially outward thereby tending to reduce the width of the groove 26 and so clamp the member 23 in the groove 26.

In use, if the member 23 is moved relatively to the member 11 in a direction to rotate the pin 19, then by virtue of the cross section of the pin 19 and the cross section of the channel 15 the arms 13 will be moved apart against their natural resilience and moreover the cross sections of the pin 19 and the channel 15 are such that when the member 23 is released the arms 13 will move towards one another thereby rotating the pin 19 and returning the member 23 to its original position. Thus, should the member 23 be struck, in use, it will be moved by the blow rather than broken thereby and will then return to its original position.

It will be appreciated that if the member 23 is moved to such an extent that the pin 19 is turned through more than 90°, the member 23 will be returned to a position displaced angularly by 180° from its original position.

Having thus described my invention what I claim as new and desire to secure by Letters Patent is:

1. A rear view mirror comprising in combination a reflective member, a support member adapted to be secured to a body panel of a road vehicle, a pair of generally parallel resilient arms integral with said support member and extending therefrom, said arms being so arranged that their free ends, remote from the support member are urged toward one another by the resilience of the arms, and a non-circular spigot associated with said reflective member, said non-circular spigot having at least one axially extending flat surface and being gripped between said free ends of said arms, with said flat surface engaged with a corresponding surface on one of said free ends and the arrangement being such that when said reflective member is moved relative to said support member in a direction to rotate said spigot through a predetermined distance, then as said spigot is rotated said arms will be flexed apart and when said reflective member is released said spigot will be returned to its original position under the action of said arms.

2. A mirror as claimed in claim 1 including a guide member engaged with the said arms and serving to prevent movement of said arms relative to one another other than in directions towards and away from one another.

3. A mirror as claimed in claim 1 including a ball and socket connection interconnecting said reflective member and said pin, said ball and socket connection permitting setting of the position of the reflective member relative to said pin.

4. A mirror as claimed in claim 3 including clamping means for said ball and socket connection whereby said reflective member can be clamped in said set position relative to said pin.

5. A mirror as claimed in claim 4 wherein the socket of said ball and socket connection is formed in a resilient, generally cylindrical member, the outer periphery of which is engaged by a clamping sleeve, said sleeve and said member being provided with coacting parts which are so shaped that rotation of said sleeve relative to said member serves to compress said member so as to reduce the volume of said socket and thereby clamp said member to the ball of the ball and socket member engaged in said socket.

6. A mirror as claimed in claim 1 wherein said support member is molded in synthetic resin.

7. A mirror as claimed in claim 1 wherein said reflective member is molded in synthetic resin.

References Cited

UNITED STATES PATENTS 3,377,117   4/1968   Biscow _____ 248—481 X

FOREIGN PATENTS 908,369   10/1962   Great Britain.

ROY D. FRAZIER, Primary Examiner

FRANK DOMOTOR, Assistant Examiner